United States Patent
Kang et al.

(10) Patent No.: US 8,525,961 B2
(45) Date of Patent: Sep. 3, 2013

(54) POLARIZING PLATE AND METHOD FOR FABRICATING THE SAME

(75) Inventors: Mu-Kai Kang, Pingtung (TW);
Wei-Chou Chen, Hsinchu (TW);
Heng-Cheng Tseng, Budai Township, Chiayi County (TW); Cheng-Yeh Tsai, Banqiao (TW)

(73) Assignee: Hannstar Display Corp., Taipei (TW)

( * ) Notice: Subject to any disclaimer, the term of this patent is extended or adjusted under 35 U.S.C. 154(b) by 411 days.

(21) Appl. No.: 12/820,585

(22) Filed: Jun. 22, 2010

(65) Prior Publication Data

US 2011/0001903 A1    Jan. 6, 2011

(30) Foreign Application Priority Data

Jul. 1, 2009   (TW) .............................. 98122339 A (51) Int. Cl.
*G02F 1/1333*   (2006.01)

(52) U.S. Cl.
USPC .......................................... 349/122

(58) Field of Classification Search
USPC ......................................... 349/122
See application file for complete search history.

(56) References Cited

U.S. PATENT DOCUMENTS

| | | | |
|---|---|---|---|
| 6,465,077 | B1 | 10/2002 | Lee et al. |
| 7,345,661 | B2 | 3/2008 | Miyagawa et al. |
| 2004/0051827 | A1* | 3/2004 | Hinata et al. ................. 349/113 |
| 2010/0321621 | A1 | 12/2010 | Kikuchi et al. |
| 2011/0102690 | A1* | 5/2011 | Kikuchi et al. ................. 349/15 |

FOREIGN PATENT DOCUMENTS

| | | | |
|---|---|---|---|
| CN | 1425146 A | | 6/2003 |
| JP | 2008164912 | * | 5/2009 |
| TW | 200415402 A | | 8/2004 |
| TW | I224207 | | 11/2004 |
| WO | 2009069358 A1 | | 6/2009 |
| WO | WO2009069351 | * | 6/2009 |

* cited by examiner

*Primary Examiner* — Phu Vu
(74) *Attorney, Agent, or Firm* — Volpe and Koenig, P.C.

(57) ABSTRACT

A polarizing plate is provided. The polarizing plate includes a polarizing layer having a first and a second opposite sides; a parallax barrier layer configured above one of the first and the second sides of the polarizing layer, and a top surface protecting layer configured above the parallax barrier layer.

17 Claims, 7 Drawing Sheets

Fig. 14

POLARIZING PLATE AND METHOD FOR FABRICATING THE SAME

FIELD OF THE INVENTION

The invention is related to a polarizing plate, more particularly to a polarizing plate having a parallax barrier layer.

BACKGROUND OF THE INVENTION

Figure 1:
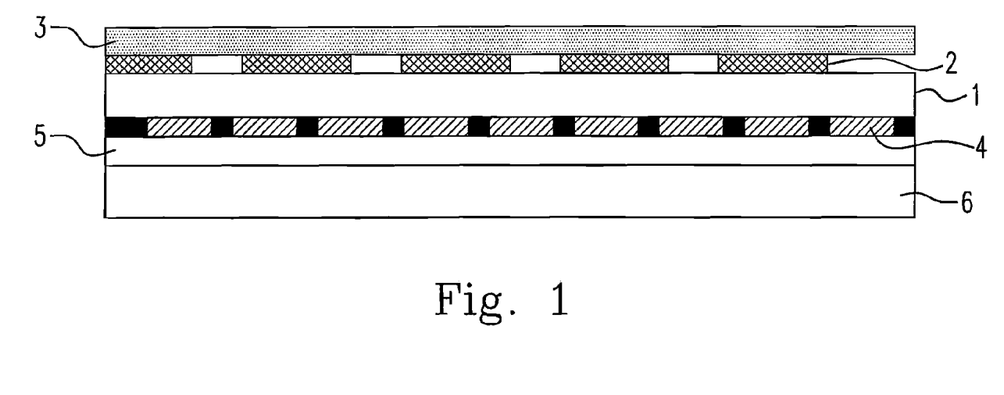
FIG. 1 is a cross-sectional view of the 3D display device from the prior art.

Nowadays the parallax barrier layer is attached to the external surface of the liquid crystal display (LCD) or integrated with the color filter (CF) glass in the three-dimensional display device having a parallax barrier layer (disclosed in Taiwan Patent No. I224207) shown in FIG. 1. It is mainly provided the method and the process for integrating the parallax barrier layer with CF glass plate to form a three-dimensional display device.

FIG. 1 which is a diagram illustrating the three-dimensional display device disclosed in Taiwan Patent No. I224207 as follows. The conventional three-dimensional display device typically includes a first substrate 1 that is located at the side near the observer and is made by transparent materials; a second substrate 6 that is configured on the opposite side of the first substrate 1; a liquid crystal layer 5 that is configured between the first substrate 1 and the second substrate 6; a parallax barrier layer 2 that is directly formed on the surface of the side approaching the observer of the first substrate 1; a polarizing plate 3 that is formed on the surface of the side neighboring to the observer of the first substrate 1; and a CF glass 4.

Figure 2:
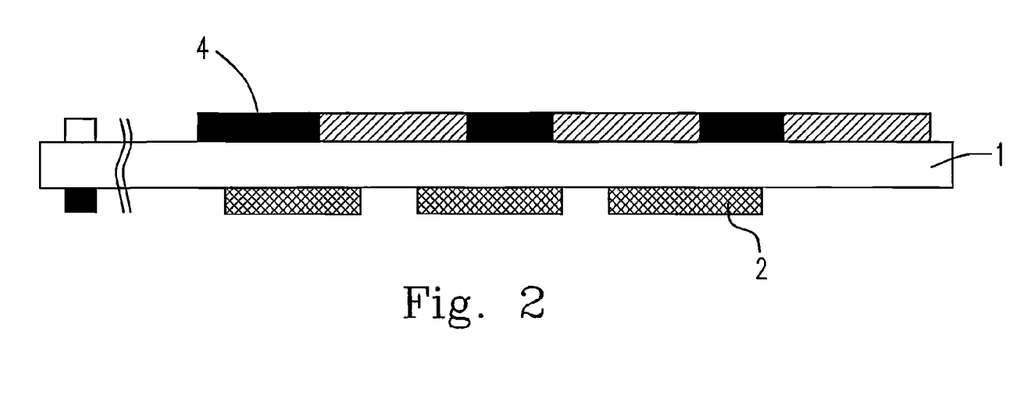
FIG. 2 is a cross-sectional view of the 3D display device having the color filter from the prior art.

Nowadays there are approximately two principle methods for fabricating a polarizing plate in the relevant technical field. One of the methods is disclosed in Taiwan Patent No. I224207 that the parallax barrier layer 2 and the CF glass 4 are fabricated respectively on the opposite sides of the substrate 1 at the same time (represented in FIG. 2). Therefore, there are some common problems, such as the pollution and the yield rate, during processing. The other one is that the parallax barrier layer is attached above the LCD panel and needs to extra attach the parallax barrier layer and the protecting layer to the polarizing plate.

Therefore, to overcome the drawbacks from the prior art and to meet the present needs, the Applicant dedicated in considerable experimentation and research, and finally accomplished the "polarizing plate having parallax barrier layer, method for manufacturing the same, and applying 3D display device thereof" of the present invention, which overcomes the above drawbacks. The present invention is briefly described as follows.

SUMMARY OF THE INVENTION

To solve the two above drawbacks, the parallax barrier layer is integrated with the polarizing plate in the present invention, which is capable to minimize the cost of materials making of the polarizing plate and simplify the process of fabricating the 3D display plate. The integrated polarizing plate is just attached to the 3D designed display plate to form the 3D display plate. The parallax barrier layer is not integrated with the CF glass in the present invention, which does not influence the fabricating process of the CF glass.

Figure 3:
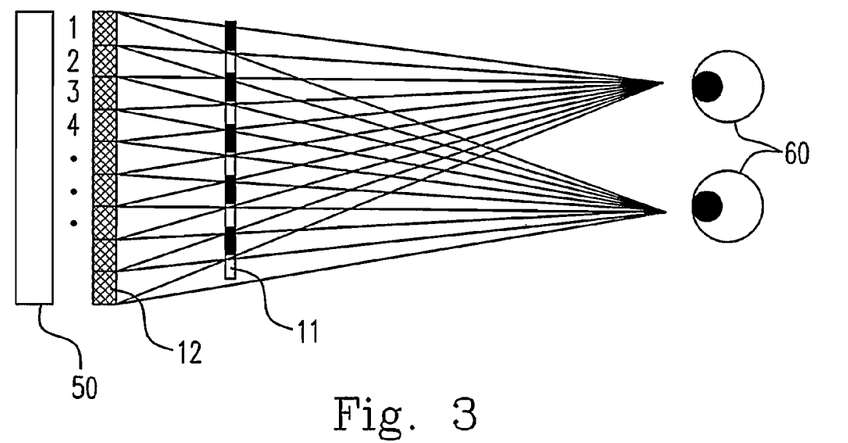
FIG. 3 is generally a display method of the 3D display with parallax barrier layer.

FIG. 3 represents the method of the 3D display having the parallax barrier. Since left and right eyes 60 of a user are influenced by the transparent/opaque structure of the parallax barrier layer 11, the pixel 12 seen is different from each other. The left eye can see the pixel images of 1, 3, 5, etc., and the right eye sees the pixel images of 2, 4, 6, etc. Therefore, different images seen by the eyes 60 are combined together into be the 3D image containing the depth information.

Figure 4:
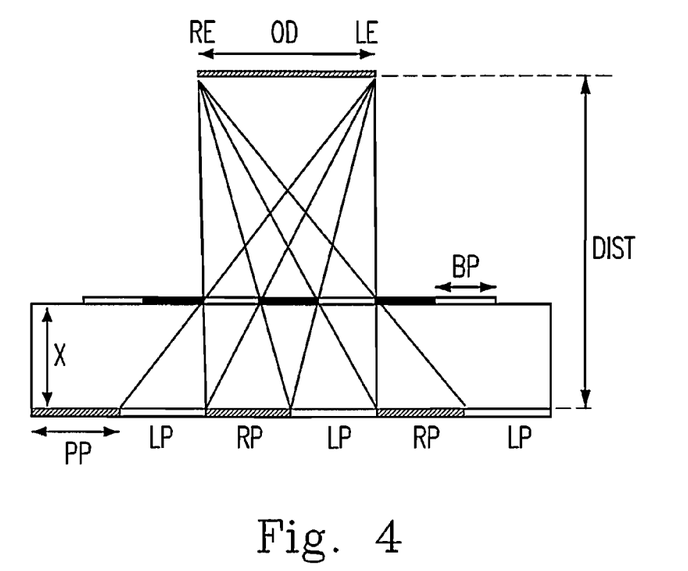
FIG. 4 is the diagram of the 3D imaging on the 3D display plate.

FIG. 4 represents the 3D image frame illustrating of the 3D display plate. LE is the left eye, RE is the right eye, LP is the pixels seen by the left eye LE, and RP is the pixels seen by the right eye LE. In addition, PP is the width of the pixel, BP is the width of the parallax barrier, OD is the distance of the eyes, x is the distance between the pixels and the parallax barrier layer, and DIST is the distance between the pixels and the eyes. The relationships of the distances can be derived from the formulas of similar triangles. The relationships are represented as follows:

parallax barrier is in front of the plate:

$$\frac{BP}{PP} = \frac{DIST - X}{DIST} \quad \frac{BP}{OD} = \frac{X}{DIST} \qquad \text{Formula (1)}$$

parallax barrier is in back of the plate:

$$\frac{BP}{PP} = \frac{DIST + X}{DIST} \qquad \text{Formula (2)}$$

The positions of the 3D image and the ratio relationship between the pixels and width of the parallax barrier are estimated by the formulas 1 and 2. Therefore, the 3D display plate can be designed by the formulas 1 and 2.

The present invention provides a polarizing plate. The structure includes: a polarizing layer having a first and a second opposite sides; a parallax barrier layer configured above one of the first and the second sides of the polarizing layer, and a top surface protecting layer configured above the parallax barrier layer. In addition, the structure of the polarizing plate further includes: a first protecting layer configured above the first side of the polarizing layer; a second protecting layer configured below the second side of the polarizing layer; a pressure sensitive adherent layer, wherein the polarizing layer, the parallax barrier layer, the first protecting layer and the second protecting layer are configured between the top surface protecting layer and the pressure sensitive adherent layer; and a separating film configured to protect the pressure sensitive adherent layer. The above parallax barrier layer is categorized into two kinds of transparency and opaque, and the width ratio of the transparent with respect to opaque parts can be adjusted in accordance with the application of the plate. The opaque parts are fabricated by opaque materials. The parallax barrier layer is formed by the ink-jet printing process, and the pigment type of ink is used in the ink jet printing process to prevent dispersing and attached to the protecting layer or the polarizing layer for integrating on the polarizing plate. Since the process is originally used for forming the sub-pixel structure on the CF, it is practicable for the accuracy of the width to fabricate the main-pixel. Moreover, since the materials are not dyes, there is no dispersing problem.

The present invention is able to minimize the cost of materials making of the polarizing plate, simplify the process of fabricating the 3D display plate and overcome the drawbacks. The above aspects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically by the following embodiments. However, it is to be noted that the following descriptions of preferred embodiments of this invention are presented herein for the purposes of illustration and description only; it is not intended to be exhaustive or to be limited to the precise form disclosed.

Moreover, in order to provide clearer descriptions more easily understood the present invention, the parts of the drawing do not draw in accordance with their relative sizes. Some sizes and scales have been exaggerated or magnified. The parts of unrelated details are not drawn completely to simplify the drawing.

Figure 5:
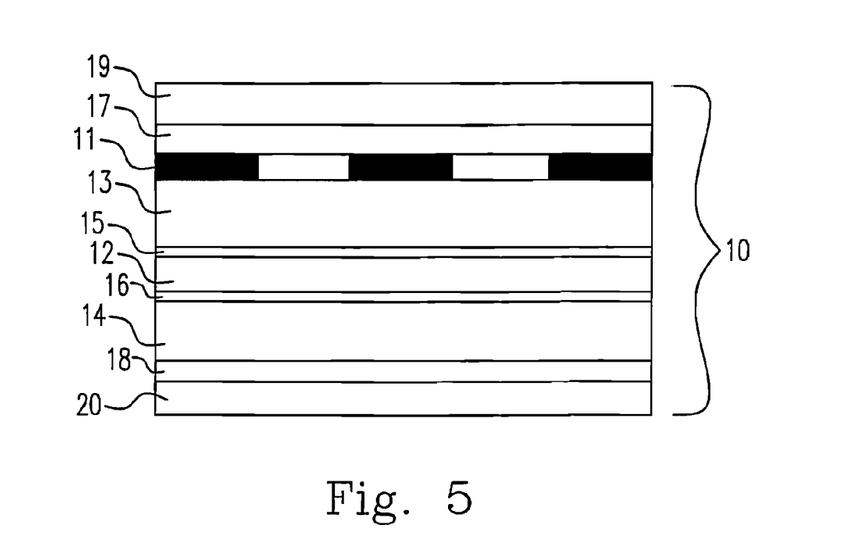
FIG. 5 is a schematic diagram illustrating of the polarizing plate having the parallax barrier layer according to the present invention.

The above purposes, features, and advantages of the present invention will be more easily understood after elaborating the following preferred embodiment of the present invention and accompanying drawings, in which:

FIG. 5 is a schematic diagram illustrating the polarizing plate having the parallax barrier layer according to the present invention. The present invention provides a polarizing plate 10 having a parallax barrier layer. The polarizing plate 10 includes: a polarizing layer 12 having a first and a second opposite sides, a first protecting layer 13 configured above the first side of the polarizing layer 12, a second protecting layer 14 configured below the second side of the polarizing layer 12, and a parallax barrier layer 11 configured above the first protecting layer 13. In addition, the polarizing plate 10 further includes: a surface protecting layer 19 configured above the parallax barrier layer, two pressure sensitive adherent layers 17 and 18 configured respectively above the parallax barrier layer 11 and below the second protecting layer 14, a separating film 20 used for protecting the pressure sensitive adherent layer 18 configured therebelow, and the first and the second adherent layers 15 and 16 configured respectively above and below the polarizing layer 12.

The above polarizing layer 12 can be utilized in any appropriate polarizing films, such as hydrophilic polymer film like polyvinyl alcohol series film, part polyvinyl alcohol series film, and ethylene vinyl acetate copolymer series of part of saponification film, etc., the substance with uniaxial extension which can absorb dichromatic substances like iodine and dichromatic dyes, and polyene oriented film like the dehydration product of polyvinyl alcohol and dehydrochlorination product of ethylene chloride.

Since polyvinyl alcohol series film has a better dichromatic property, it is appropriate for being the polarizing layer. Preferably, the polarizing layer has a material being polyvinyl alcohol and is formed by polymer extension film mainly composed of polyvinyl alcohol series resin with dichromatic substances. The above protecting layers 13 and 14 are formed by polymer film mainly composed of cellulose series resin such as triacetyl cellulose (TAC), cyclic olefin copolymer, and cyclic olefin polymer, etc., wherein TAC is preferable.

Figure 6:
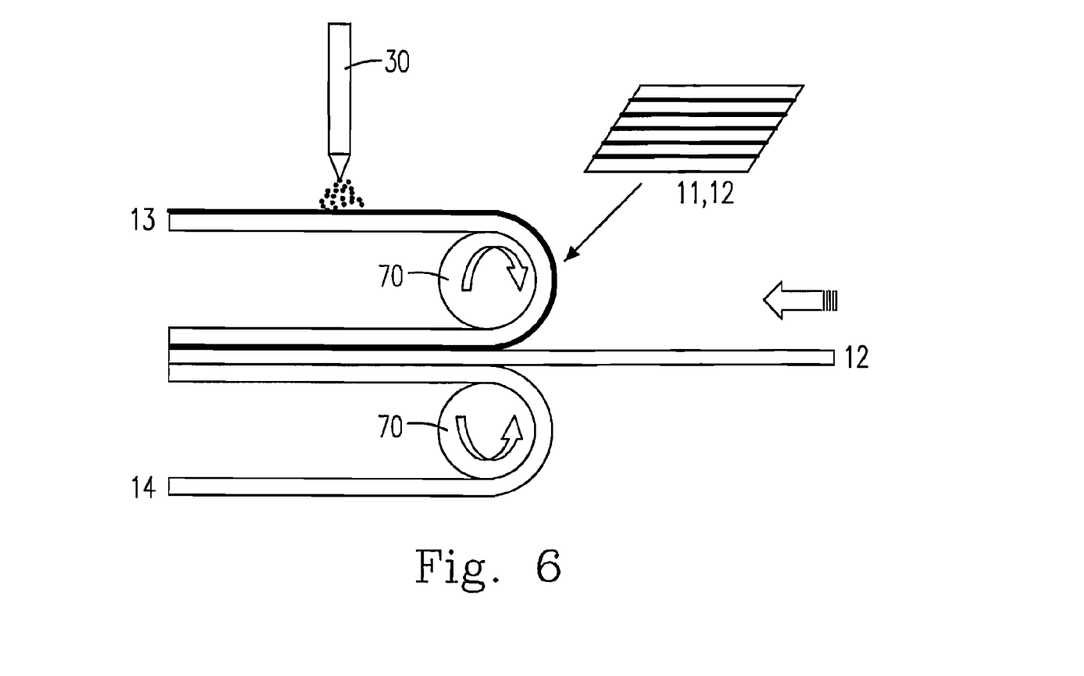
FIG. 6 is the diagram of the method for forming the parallax barrier layer.

The above parallax barrier layer 11 is categorized into two kinds of transparency and opaque, and the width ratio of the transparent with respect to opaque parts can be adjusted in accordance with the application of the plate, wherein the transparent parts are fabricated by the transparent materials. The parallax barrier layer 11 can be formed by an ink jet printing process and a pigment type of ink is used in the ink jet printing process to prevent dispersing. The pigment is attached to the protecting layers 13 and 14 or the polarizing layer 12 and integrated into the polarizing plate 10 by the printing nozzle 30. Since the above process is originally used for forming the sub-pixel structure on the CF, it is practicable for the accuracy of the width to fabricate the main-pixel. In addition, since the materials are pigments not dyes, they do not disperse. The pigment type of ink used for the parallax barrier layer 11 are made of the opaque colors or deep colors such as black, dark blue, deep red, etc.

A method of the preferred embodiment for fabricating a polarizing plate includes steps of: providing a polarizing layer 12, a first protecting layer 13 and a second protecting layer 14; forming a parallax barrier 11 configured above or below the first protecting layer 13; and connecting the polarizing layer 12 with the protecting layers 13 and 14 by adhesive pressing; roast the polarizing layer 12 and the protecting layers 13 and 14 in the roaster; and hot-pressing the polarizing layer 12 and the protecting layers 13 and 14 by heating cylinder to form a polarizing plate 10.

In the process of the preferred embodiment for forming the parallax barrier layer 11, the pigment is attached to the first protecting layer 13 to form dark bands as a parallax barrier by the printing nozzle 30. Moreover, the parallax barrier layer 11 can be formed by an ink-jet printing process and a pigment type of ink is used in the ink-jet printing process to prevent dispersing. The pigment type of ink used for the above parallax barrier layer 11 is made of one of opaque colors and deep colors, such as black, dark blue and deep red.

The connecting process includes steps of: coating the first and the second adherent layers 15 and 16 configured above and below the polarizing layer 12; and hot-pressing the polarizing layer 12 and the first and the second protecting layers 13 and 14, wherein the first and the second adherent layers 15 and 16 have materials being one of the polyurethane glue and polyvinyl alcohol glue. Furthermore, in accordance with the demand the process can proceed with the treatment for improving the adhesion such as drying process and adhesive process. The embodiments of the drying process are consisted of corona treatment, gas corona treatment, plasma treatment, low pressure UV treatment, etc. It is the embodiments of the adhesive process to coat the adhesive materials such as cellulose series resin, carbamate series resin, silence coupling agents, silicon primers, PVA, nylon, styrene series resin, etc.

It can also be performed the drying process and adhesive process simultaneously. Alternatively, the adhesion can be improved by using sodium hydroxide aqueous solution to perform saponification process. It can be also performed the saponification process and adhesive process simultaneously. The above protecting layers 13 and 14 are used the transparent protecting films like cellulose series resin film, such as triacetyl cellulose film, diacetyl cellulose, etc., wherein is preferably the triacetyl cellulose film, especially triacetyl cellulose film which has been performed the saponification process.

The fabrication method of the above polarizing layer 12 includes steps of: expanding, dyeing, crosslinking, and extending. In the expanding step, polyvinyl alcohol series film is immersed in the water to expand and cleaned off the dirt and anti-adherent agent. This also can prevent non-uniformly dyeing due to the expanding step. In the dyeing step, polyvinyl alcohol series film is immersed in the dyeing agent with dichromatic substances like iodine or dichromatic dyes.

In the crosslinking step, polyvinyl alcohol series film is immersed in the crosslinking agent with boric acid or borax. In the extending step, polyvinyl alcohol series film is extended to three to seven times. Since the order of the steps is not limited, some steps can be treated simultaneously. For example, it can be dyed and extended simultaneously, dyed and then extended, or extended and then dyed. It can be also extended in the aqueous solution with boric acid or calcium iodide.

The above first protecting layers 13 and 14 are stuck respectively above and below the polarizing layer 12 in the fabrication method of the present invention. Since unnecessary water can be removed well by the drying process, this can notably prevent the decoloration phenomenon like changing red, the light leakage phenomenon, and the phenomenon that transmittance would be increased to result in decreasing the degree of polarization.

The condition of the drying process, such as drying temperature, drying time and drying method, can be adjusted in accordance with the purpose. The first protecting layer 13 and the second protecting layer 14 are stuck to configure respectively above and below the polarizing layer 12 by the first and the second adherent layers 15 and 16. Any kinds of appropriate adherent agents can be chosen to be materials of the first and the second adherent layers 15 and 16 if they can adhere very well.

Preferably, it had better use the adherent agents with optical isotropy such as polyvinyl alcohol series adherent agents, carbamate series adherent agents, acrylic acid series adherent agents, epoxy series adherent agents. If the polarizing layer 12 is grouped into polyvinyl alcohol series, it had better use polyvinyl alcohol series adherent agents. It is because the adhesive property would be particularly good. Any kinds of the polyvinyl alcohol series resin can be chosen for the polyvinyl alcohol series resin, for example polyvinyl alcohol without substituent or polyvinyl alcohol with high functional group. Preferably, it is used polyvinyl alcohol with high functional group since this can notably improve durability of the polarizing plate. The embodiment of the polyvinyl alcohol with high functional group is polyvinyl alcohol resin modified by acetoacetyl.

The first and the second adherent layers 15 and 16 are formed by coating the aqueous solution of the adherent agent aqueous solution and then drying. The adherent agents can be added some crosslinking agents, wherein they are preferably the water soluble crosslink agents, such as boric acid, borax, glutaraldehyde, melamine, oxalic acid, etc. Furthermore, the adherent agents can be added any appropriate additive agents such as antioxidant and ultraviolet absorbent and/or catalysts such as acids.

The fabricated method of the preferred embodiment further includes steps of: providing a top surface protecting layer 19; coating a press sensitive adherent layer 17 to protect the polarizing layer 12 between the top surface protecting layer 19 and the first protecting layer 13 on which a parallax barrier layer 11 has be formed by ink jet printing; providing a separating film 20; and coating a press sensitive adherent layer 18 between the separating film 20 and the second protecting layer 14 to form the polarizing plate 10 with the parallax barrier layer 11.

Figure 7:
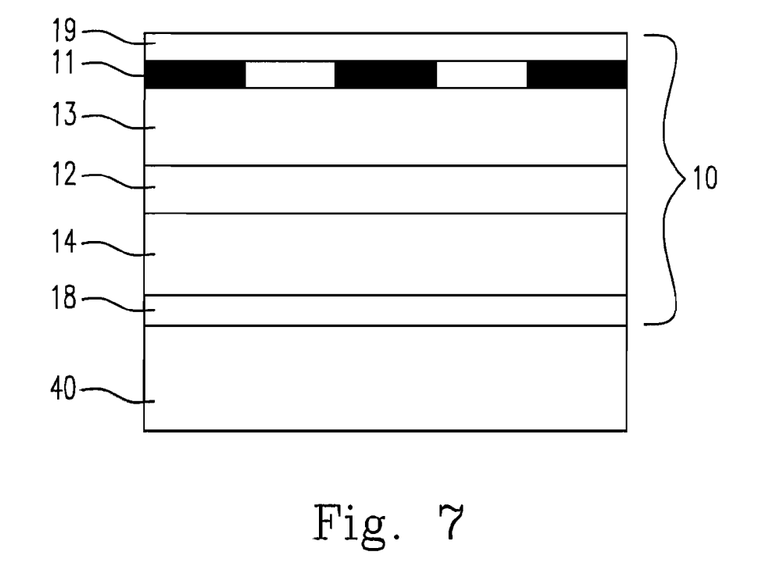
FIG. 7 is a schematic diagram illustrating of the 3D display device according to a first preferred embodiment of the present invention.

FIG. 7 is the schematic diagram illustrating the 3D display device according to a first preferred embodiment of the present invention. The preferred embodiment provides a framework of the 3D display device. The parallax barrier layer 11 is integrated above the first protecting layer 13, and the polarizing plate 10 is combined with the LCD cell 40 to form 3D display device represented in the FIG. 7. In accordance with the framework we calculate the distance between the parallax barrier layer and pixels to derive the position of the 3D image from the formula (1) for designing the 3D display plate in the embodiment. According to the 19-inch panel, the width of the pixel PP is 0.1 mm, and the distance x between the pixels and the parallax barrier layer is 0.6 mm (the thicknesses of the polarizing plate and the CF glass are respectively 0.2 mm and 0.4 mm). Since the distance of the eyes OD is different from each other, the distance OD of the eyes is preferably regarded as 60 mm to 70 mm for the best design. Therefore, we derive the width of the parallax barrier from the formula (1) by regarding the distance OD of the eyes as 60 mm to 70 mm. When the width of the parallax barrier is set to be constant, the men whose distance of the eyes are 65 mm can see the 3D image, while the other men whose distance of the eyes are not 65 mm can see the 3D image by adjust the distance between the image and them.

Figure 8:
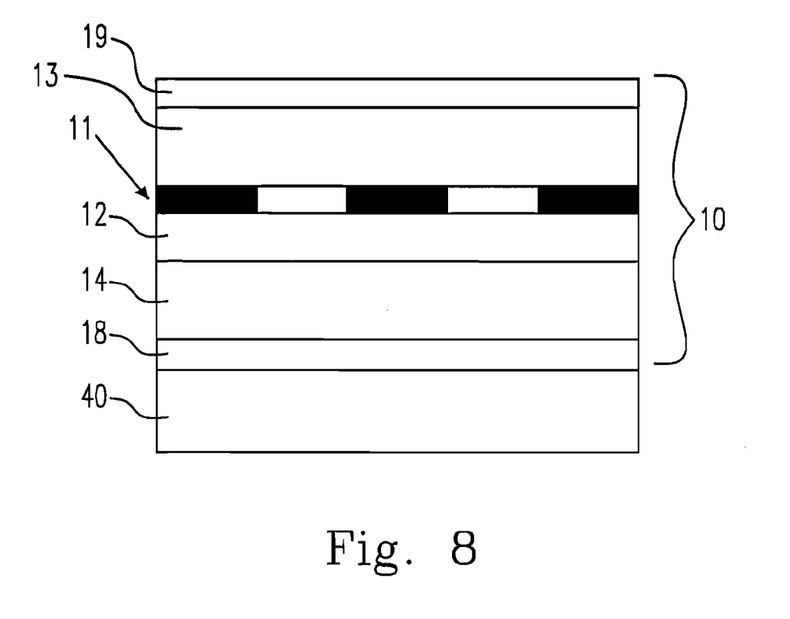
FIG. 8 is a schematic diagram illustrating of the 3D display device according to a second preferred embodiment of the present invention.

FIG. 8 is the schematic diagram illustrating the 3D display device according to a second preferred embodiment of the present invention. The parallax barrier layer 11 is integrated between the first protecting layer 13 and the polarizing layer 12, and the polarizing plate 10 is combined with the LCD cell 40 to form 3D display device represented in the FIG. 8. According to the 19-inch panel, the width of the pixels PP is 0.1 mm, and the distance x between the pixels and the parallax barrier layer is 0.5 mm (the thicknesses of the polarizing plate and the CF glass are respectively 0.1 mm and 0.4 mm). The distance of the eyes is regarded as 60 mm to 70 mm for the best design of the parallax barrier layer.

Figure 9:
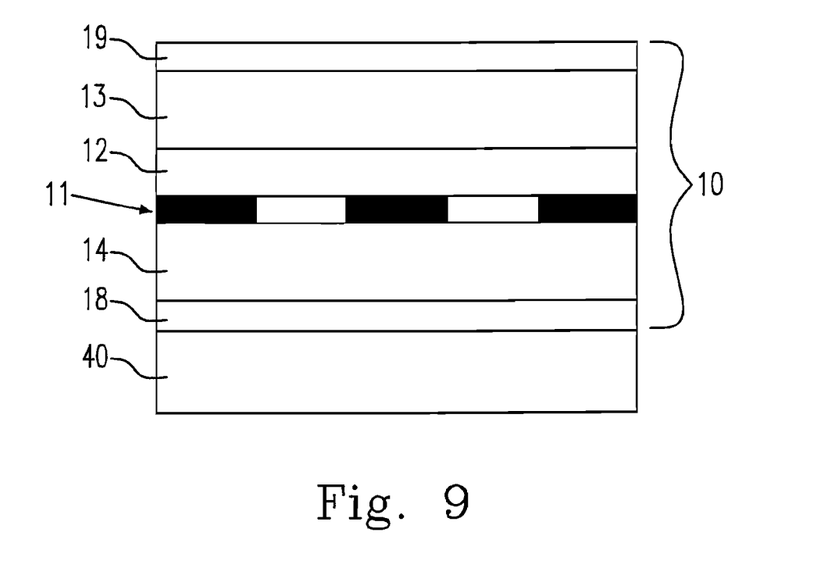
FIG. 9 is the structure diagram of the 3D display device according to a third preferred embodiment of the present invention.

FIG. 9 is the schematic diagram illustrating the 3D display device according to a third preferred embodiment of the present invention. The parallax barrier layer 11 is integrated below the polarizing layer 12, and the polarizing plate 10 is combined with the LCD cell 40 to form 3D display device represented in the FIG. 9. According to the 19-inch panel, the width of the pixels PP is 0.1 mm, and the distance x between the pixels and the parallax barrier layer is 0.5 mm (the thicknesses of the polarizing plate and the CF glass are respectively 0.1 mm and 0.4 mm). The distance of the eyes is regarded as 60 mm to 70 mm for the best design of the parallax barrier layer.

Figure 10:
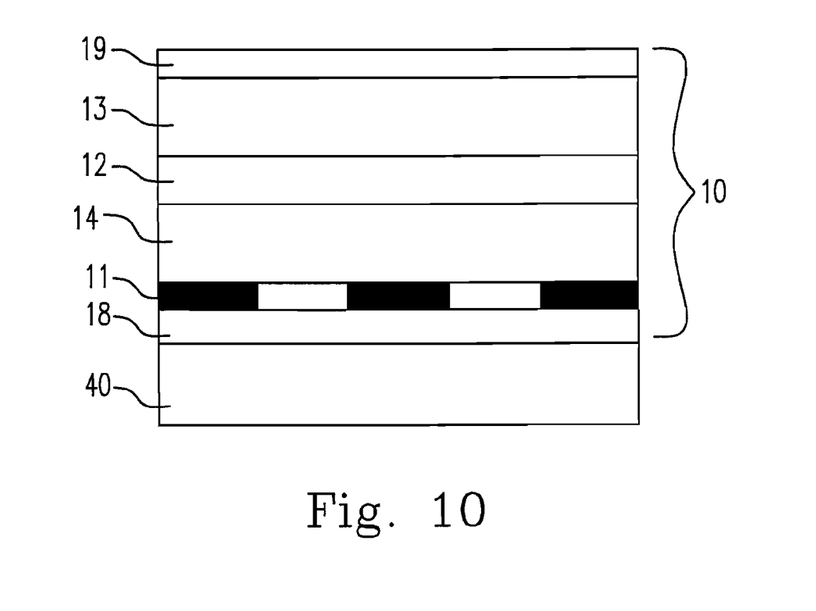
FIG. 10 is the structure diagram of the 3D display device according to a fourth preferred embodiment of the present invention.

FIG. 10 is the schematic diagram illustrating the 3D display device according to a fourth preferred embodiment of the present invention. The parallax barrier layer 11 is integrated below the second protecting layer 14, and the polarizing plate 10 is combined with the LCD cell 40 to form 3D display device represented in the FIG. 10. According to the 19-inch panel, the width of the pixels PP is 0.1 mm, and the distance x between the pixels and the parallax barrier layer is 0.4 mm (the thickness of the CF glass is 0.4 mm). The distance of the eyes is regarded as 60 mm to 70 mm for the best design of the parallax barrier layer.

Figure 11:
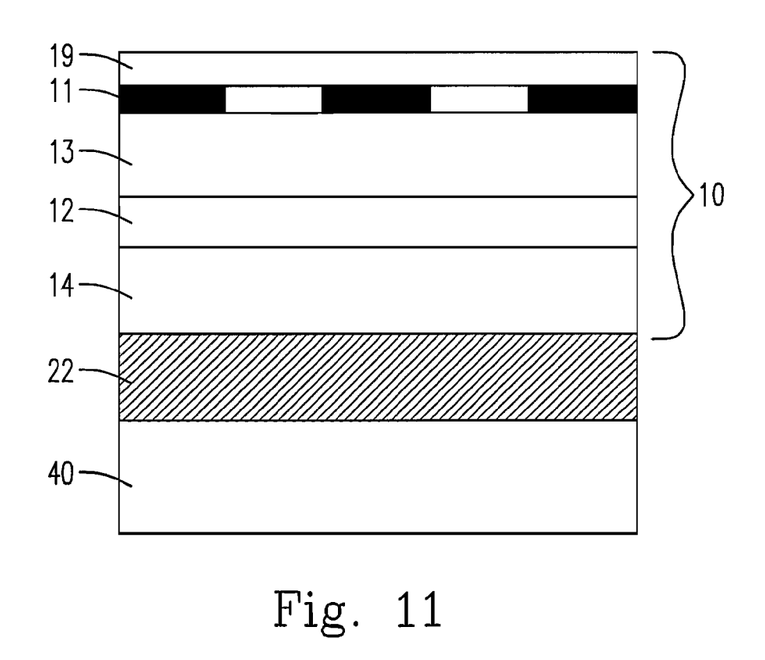
FIG. 11 is the structure diagram of the 3D display device according to a fifth preferred embodiment of the present invention.

FIG. 11 is the schematic diagram illustrating the 3D display device according to a fifth preferred embodiment of the present invention. The parallax barrier layer 11 is integrated above the first protecting layer 13, and the polarizing plate 10 is combined with the compensating film 22 and the LCD cell 40 to form 3D display device represented in the FIG. 11. In the fifth preferred embodiment, since the structure is different from the structure in the first preferred embodiment due to the compensating film (thickness is 0.005 mm), the position of the 3D image would a few centimeter difference thereto.

Figure 12:
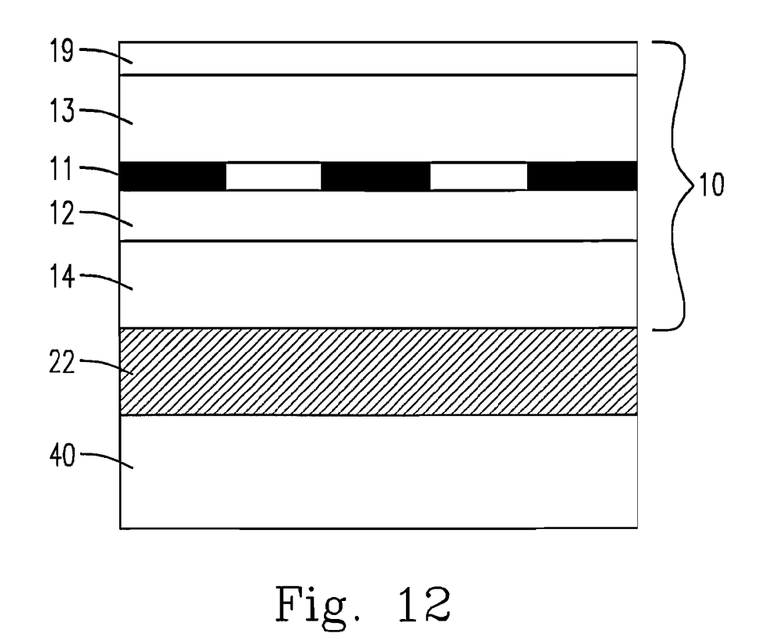
FIG. 12 is the structure diagram of the 3D display device according to a sixth preferred embodiment of the present invention.

FIG. 12 is the schematic diagram illustrating the 3D display device according to a sixth preferred embodiment of the present invention. The parallax barrier layer 11 is integrated between the first protecting layer 13 and the polarizing layer 12, and the polarizing plate 10 is combined with the compensating film 22 and the LCD cell 40 to form 3D display device represented in the FIG. 12. In the sixth preferred embodiment, since the structure is different from the structure in the second preferred embodiment due to the compensating film (thickness is 0.005 mm), the position of the 3D image would a few centimeter difference thereto.

Figure 13:
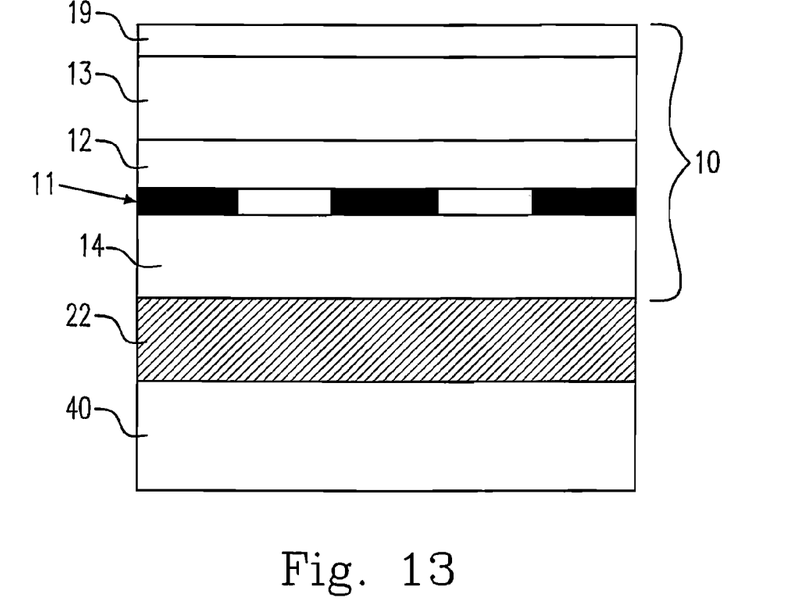
FIG. 13 is the structure diagram of the 3D display device according to a seventh preferred embodiment of the present invention.

FIG. 13 is the schematic diagram illustrating the 3D display device according to a seventh preferred embodiment of the present invention. The parallax barrier layer 11 is integrated below the polarizing layer 12, and the polarizing plate 10 is combined the compensating film 22 and the LCD cell 40 to form 3D display device represented in the FIG. 13. In the seventh preferred embodiment, since the structure is different from the structure in the third preferred embodiment due to the compensating film (thickness is 0.005 mm), the position of the 3D image would a few centimeter difference thereto.

Figure 14:
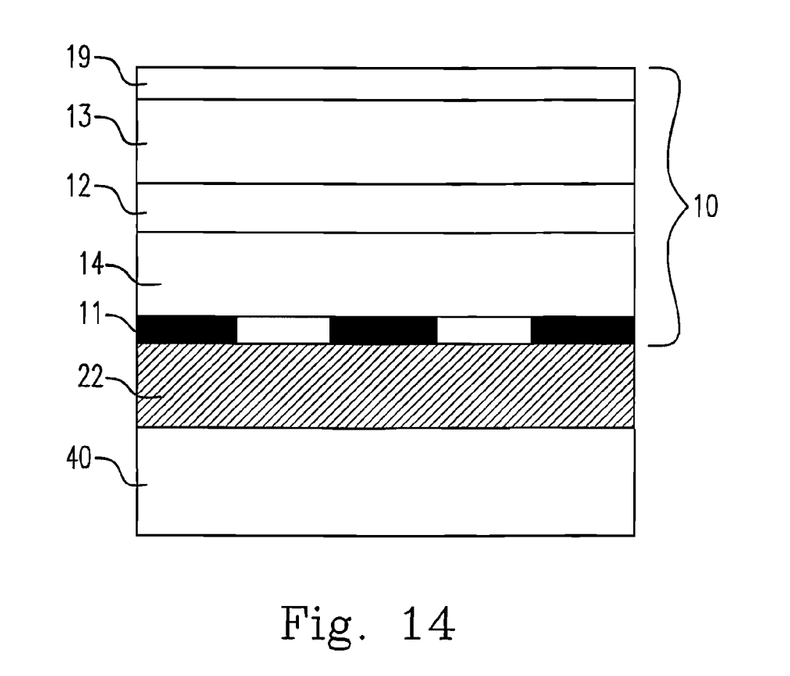
FIG. 14 is the structure diagram of the 3D display device according to an eighth preferred embodiment of the present invention.

FIG. 14 is the schematic diagram illustrating the 3D display device according to an eighth preferred embodiment of the present invention. The parallax barrier layer 11 is integrated below the second protecting layer 14, and the polarizing plate 10 is combined the compensating film 22 and the LCD cell 40 to form 3D display device represented in the FIG. 14. In the eighth preferred embodiment, since the structure is different from the structure in the fourth preferred embodiment due to the compensating film (thickness is 0.005 mm), the position of the 3D image would a few centimeter difference thereto.

The present invention is described specifically to the above embodiments. The LCD device which is one of the display device is chosen to describe; however, the invention can be used in all of the LCD display devices with the parallax barrier plate like self light emission display devices, such as electro luminescent (EL) display, plasma display (PD), field emission display (FED). While the invention has been described by the LCD device, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. A polarizing plate, comprising:
   a polarizing layer having a first and a second opposite sides;
   a parallax barrier layer configured above one of the first and the second sides of the polarizing layer,
   a top surface protecting layer configured above the parallax barrier layer;
   a first protecting layer configured above the first side of the polarizing layer;
   a second protecting layer configured below the second side of the polarizing layer, wherein the first and the second protecting layers are under the top surface protecting layer; and
   a compensating film, wherein the polarizing layer, the parallax barrier layer, the first protecting layer and the second protecting layer are configured between the top surface protecting layer and the compensating film.

2. The polarizing plate as claimed in claim 1, further comprising: a pressure sensitive adherent layer, wherein the polarizing layer, the parallax barrier layer,
   the first protecting layer and the second protecting layer are configured between
   the top surface protecting layer and the pressure sensitive adherent layer.

3. The polarizing plate as claimed in claim 2, wherein the pressure sensitive adherent layer contacts with a liquid crystal display (LCD) cell.

4. The polarizing plate as claimed in claim 1, wherein each of the first and the second protecting layers has a polymer film with a cellulose series resin.

5. The polarizing plate as claimed in claim 1, wherein each of the first and the 17 second protecting layers has a material being one selected from a group consisting of a triacetyl cellulose, a cyclic olefin copolymer, a cyclic olefin polymer and a combination thereof.

6. The polarizing plate as claimed in claim 1, further comprising:
   a first adherent layer configured above the first side of the polarizing layer;
   a first protecting layer configured above the first adherent layer and between the parallax barrier layer and the first adherent layer;
   a first pressure sensitive adherent layer configured above the parallax barrier layer and below the top surface protecting layer;
   a second adherent layer configured below the second side of the polarizing layer;
   a second protecting layer configured below the second adherent layer;
   a second pressure sensitive adherent layer configured below the second protecting layer; and
   a separating film configured below the second pressure sensitive adherent layer.

7. The polarizing plate as claimed in claim 1, wherein the polarizing layer has a polymer film with a polyvinyl alcohol series resin and is configured below the surface protecting layer.

8. The polarizing plate as claimed in claim 1, wherein the polarizing layer has a polyvinyl alcohol.

9. A 3D display device, comprising:
   a display cell; and a compensating film configured above the display cell; and a polarizing plate configured above the compensating film and having a top surface protecting layer and a parallax barrier layer configured below the 18 top surface protecting layer.

10. The 3D display device as claimed in claim 9, wherein the display cell is one selected from a group consisting of a liquid crystal display (LCD), an electro luminescent (EL) display, a plasma display (PD), a field emission display (FED) and a self light emission display device.

11. A method for fabricating a polarizing a 3D display device having a display cell, comprising steps of:

providing a polarizing layer having a first and a second opposite sides;

forming a parallax barrier layer configured above one of the first and the second sides of the polarizing layer;

providing a top surface protecting layer configured above the parallax barrier layer, wherein the polarizing layer, the barrier layer and the top surface protective layer are integrated into a polarizing plate; and forming a compensating film to combine the polarizing plate with the display cell.

12. A method as claimed in claim 11, further comprising steps of:

forming a first protecting layer configured below the top surface protecting layer and above the first side of the polarizing layer; and forming a second protecting layer configured below the top surface protecting layer and below the second side of the polarizing layer.

13. A method as claimed in claim 11, further comprising steps of:

forming a first and a second adherent layers respectively above the first side and below the second side of the polarizing layer;

forming a first protecting layer above the first adherent layer; and forming a second protecting layer below the second adherent layer.

14. The method as claimed in claim 13, wherein the first and the second adherent layers are coated respectively above the first side and below the second side of the polarizing layer and the polarizing layer is hot-pressed between the 19 first and second protecting layers.

15. The method as claimed in claim 13 further comprising steps of:

providing a separating film;

forming a first press sensitive adherent layer between the first protecting layer and the top surface protecting layer; and forming a second press sensitive adherent layer between the second protecting layer and the separating film.

16. The method as claimed in claim 15, wherein the first and the second press sensitive adherent layers are formed by a coating process.

17. The method as claimed in claim 11, wherein the parallax barrier layer is formed by an ink jet printing process and a pigment type of ink made of one of opaque colors and deep colors is used in the ink-jet printing process.

* * * * *